No. 866,032. PATENTED SEPT. 17, 1907.
W. B. HUGHES.
GAS PRODUCER.
APPLICATION FILED MAY 23, 1907.
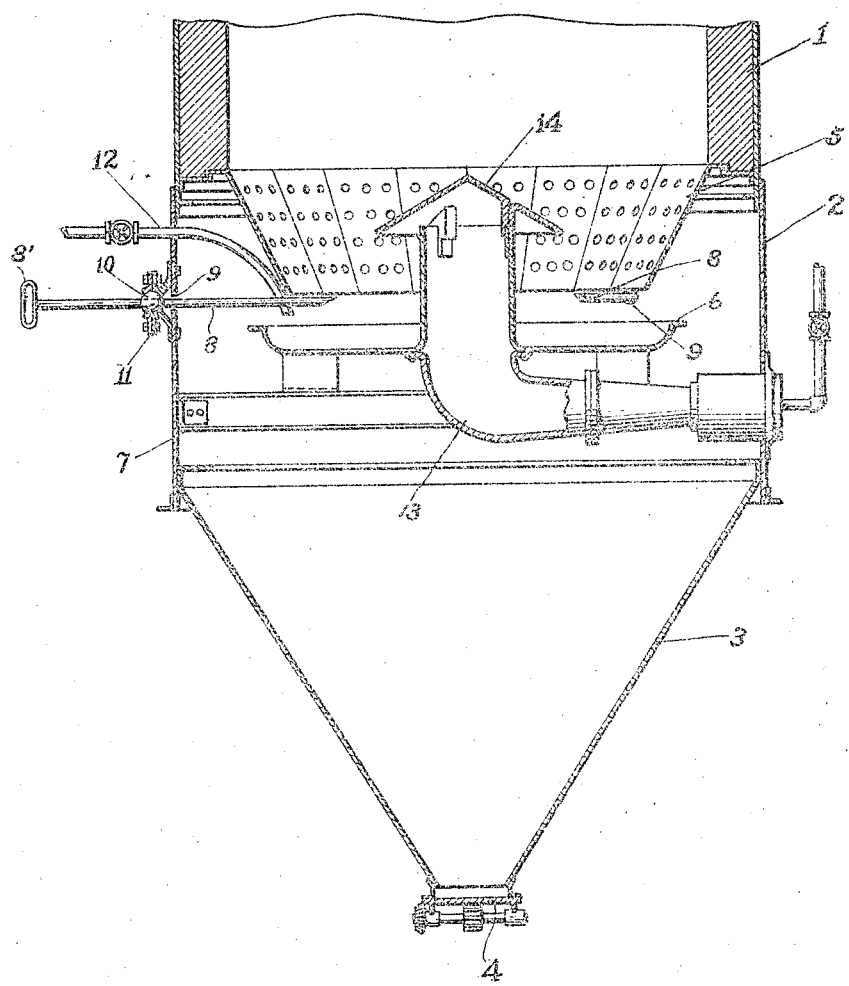
WITNESSES:
INVENTOR
Wm. B. Hughes
BY
Chas. V. Butler
ATTORNEY

UNITED STATES PATENT OFFICE.

WILLIAM B. HUGHES, OF CLEVELAND, OHIO.

GAS-PRODUCER.

No. 866,032.　　　Specification of Letters Patent.　　Patented Sept. 17, 1907.

Application filed May 23, 1907. Serial No. 375,288.

*To all whom it may concern:*

Be it known that I, WILLIAM B. HUGHES, a citizen of the United States, residing at Cleveland, in the county of Cuyahoga and State of Ohio, have invented certain Improvements in Gas-Producers, of which the following is a specification.

This invention is a gas producer having a body terminating in a closed bottom or bottom chamber, an ash hopper depending from the body into the chamber, a basin for holding water and ashes beneath the hopper, and a poker or pokers mounted to operate between the hopper and basin.

It is a leading object of my invention to produce an inexpensive and efficient construction from which the ashes can be removed easily without interference with the operation of the producer. To this end a basin is used beneath the hopper for supporting the ashes and holding water for "rotting" them; an ash holding casing is formed around the bottom and beneath the body of the producer so as to inclose the hopper, the basin, and the blower passing through the basin into the hopper; and pokers, supported in universal bearings, extend through openings in the casing between the hopper and the basin.

The accompanying drawing represents a vertical sectional view of the lower part of a producer made in accordance with my improvements.

As shown in the drawings, the producer body 1 has depending therefrom a casing composed of the cylindrical portion 2 fixed thereto and a conical portion 3 fixed to the portion 2 and opening by a valve 4. Depending from the body within the casing is the ash hopper 5 and beneath the hopper is the basin 6 carried by a beam 7 supported by the casing. Pokers 8, properly spaced around the producer, extend through apertures 9 in the casing between the hopper and basin. These pokers have thereon the balls 10 which revolve in bearings 11 carried by the casing, the pokers thus having universal bearings by which an operator grasping a handle 8' can work the opposite end about over a considerable space and remove ashes through the space between the hopper and basin. Water is introduced to the basin, by means of a pipe or hose 12 extending through the casing, to wet the ashes, "rot" them, and facilitate their removal, and also to provide moisture for evaporation and use in carrying on combustion in combination with air introduced by the blower in lieu of steam as now employed.

The blower 13 extends through the casing beneath the basin and then upwardly through the basin to a termination in a dome 14 within the body.

It will be understood that the pokers may be movable through the balls and bearings providing them with universal joints.

Having described my invention, I claim:—

1. A gas producer having a body, a bottom casing depending therefrom, a water and ash basin in the casing beneath the body, and a poker extending through the casing between the body and basin, said poker being movable transversely to its length.

2. A gas producer having a body, a bottom casing depending therefrom, a basin beneath the body, and a poker having a universal bearing disposed so as to permit it to be worked between the body and basin.

3. A gas producer having a body, a stationary basin beneath said body, and a bottom casing depending from said body and inclosing said basin.

4. A gas producer having a body, a hopper depending from said body, a stationary basin beneath said hopper, a casing inclosing said hopper and basin, and a laterally movable poker extending through an aperture of said casing between said hopper and basin.

5. A gas producer having a body, a stationary basin beneath said body, a casing depending from said body and inclosing said basin, and a blower passing through said casing and basin.

In testimony whereof, I have hereunto set my name this 18th day of May, 1907, in the presence of the subscribing witnesses.

WM. B. HUGHES.

Witnesses:
　F. J. LAUGER,
　E. S. SANDERSON.